(12) United States Patent
Chang

(10) Patent No.: US 8,120,847 B2
(45) Date of Patent: Feb. 21, 2012

(54) THROUGH-THE-LENS LOUPE ASSEMBLY WITH INTERPUPILLARY DISTANCE ADJUSTMENT

(75) Inventor: Byung J. Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 329 days.

(21) Appl. No.: 12/465,841

(22) Filed: May 14, 2009

(65) Prior Publication Data

US 2010/0290115 A1 Nov. 18, 2010

(51) Int. Cl.
*G02B 25/00* (2006.01)
*A61B 3/11* (2006.01)

(52) U.S. Cl. ......... 359/481; 359/412; 359/816; 351/204

(58) Field of Classification Search .................. 359/411, 359/412, 481, 816; 351/204, 68, 70, 124, 351/128

See application file for complete search history.

(56) References Cited

U.S. PATENT DOCUMENTS

| 2,887,008 | A | * | 5/1959 | Gross | 351/60 |
| 3,273,456 | A | * | 9/1966 | Feinbloom | 359/481 |
| 3,610,743 | A | * | 10/1971 | Lindblom | 351/107 |
| 3,865,468 | A | * | 2/1975 | Holcomb | 359/481 |
| 4,568,154 | A | * | 2/1986 | Beecher | 359/411 |
| 5,121,251 | A | * | 6/1992 | Edwards | 359/368 |
| 6,704,141 | B1 | * | 3/2004 | Nowak et al. | 359/411 |
| 6,799,847 | B2 | * | 10/2004 | Caplan | 351/128 |

* cited by examiner

*Primary Examiner* — Frank Font

(74) *Attorney, Agent, or Firm* — Gifford, Krass, Sprinkle, Anderson & Citkowski, P.C.

(57) ABSTRACT

A medical/dental loupe assembly provides through-the-lens oculars with an inconspicuous interpupillary distance adjustment capability. The system includes a pair of lenses, each lens having a telemicroscopic ocular cemented therethrough, and an upper portion, one on each side of a wearer's nose. A generally horizontal slot is formed in the upper portion of one of the lenses, and a bridge member connects the upper portions of the two lenses. The bridge member has two ends, one end of which is coupled to the slot through a fastener that may be loosened and tightened, thereby allowing the distance between the oculars to be adjusted and locked into position in accordance with the interpupillary requirements of a user.

7 Claims, 1 Drawing Sheet

THROUGH-THE-LENS LOUPE ASSEMBLY WITH INTERPUPILLARY DISTANCE ADJUSTMENT

FIELD OF BE INVENTION

This invention relates generally to loupe assemblies for surgical, medical and dental professionals and, in particular, to a through-the-lens loupe assembly having an interpupillary distance adjustment.

BACKGROUND OF THE INVENTION

There are basically two types of loupe assemblies for surgical, medical and dental professionals: (1) the flip-up type, which provides for multiple degrees of adjustment freedom, and (2) the through-the-lens (TTL) type, which offer few, if any, adjustments after manufacture and are therefore often custom made.

Whereas flip-up type loupe assemblies typically offer an interpupillary distance adjustment, TTL versions ordinarily do not. There have been attempts, however, to provide TTL loupes with such an adjustment, at least for fitting purposes. According to U.S. Pat. No. 6,799,847, for example, a sliding bridge eyeglass frame provides salespersons and customers the ability to ensure that a proper interpupillary distance between loupe oculars is achieved during a fitting session. The "demonstration frame" includes first and second bridge portions which are slidably and reversibly fixedly attached to lenses, thus allowing a customized fitting for particular customers. Once proper interpupillary distances are achieved, the first and second frame members are secured together such that proper dimensions and configurations can be obtained for production of a final product.

While devices such as these provide for pre-production adjustment, the need remains for a TTL loupe product that can be adjusted in the field, preferably with a mechanism that does not interfere with ornamental appearance and with a nose bridge.

SUMMARY OF THE INVENTION

This invention resides in an ocular assembly of the type used by medical and dental professionals, which improves upon the prior art by providing through-the-lens loupes with an inconspicuous interpupillary distance adjustment capability. The system includes a pair of lenses, each lens having a telemicroscopic ocular cemented therethrough, and an upper portion, one on each side of a wearer's nose. A generally horizontal slot is formed in the upper portion of one of the lenses, and a bridge member connects the upper portions of the two lenses. The bridge member has two ends, one end of which is coupled to the slot through a fastener that may be loosened and tightened, thereby allowing the distance between the oculars to be adjusted and locked into position in accordance with the interpupillary requirements of a user.

In the preferred embodiment, the upper portion of each lens includes a slot, and each end of the bridge member is slidingly coupled to a respective one of the slots through a separate fastener. The end of the bridge member which is coupled to the slot through a fastener may include a threaded bore to receive a threaded fastener. The loupe assembly may further include a pair of nose pads, each coupled directly to the bridge member such that the interrelationship of the nose pads does not change when the distance between the loupes is adjusted. The lenses may be rimless, and the telemicroscopic oculars may be based upon Galilean, Keplerian, or other optical configurations.

DETAILED DESCRIPTION OF THE INVENTION

Figure 1:
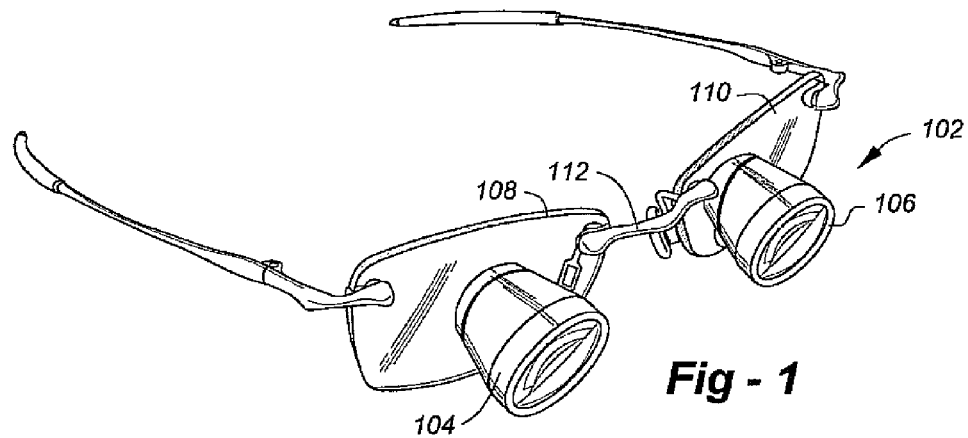
FIG. 1 is a perspective view of a preferred embodiment of the invention.

Turning now to the drawings, FIG. 1 is a perspective view of a preferred embodiment of the invention indicated generally at 102. The product is in the form of eyeglass frames having lens portions 108, 110, each with a respective through-the-lens ocular cemented in position. The lenses may be glass or plastic, and the oculars may be of any design such a Galilean, Keplerian, etc.

In the preferred embodiment the lenses are rimless through material encircling each lens is not precluded. Importantly, however, the invention includes at least one lens with a horizontally oriented slot such as 122 or 124, and a generally horizontally oriented bridge member 112 having at least one end which is coupled to a slot with a fastener such as bolts 118, or 120. In the preferred embodiment, each lens has a slot and the bridge member has two opposing threaded bores to receive bolts through each slot, thereby facilitating a balanced adjustment from side-to-side along generally horizontal axis 128. The slots have a height on the order of 1-2 mm and a width on the order of 5-10 mm, though the invention is not strictly limited to these dimensions.

Figure 2:
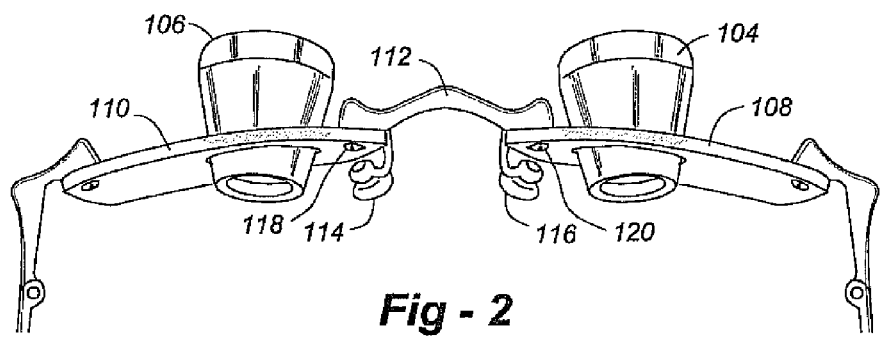
FIG. 2 is a top view of the embodiment of FIG. 1.
Figure 3:
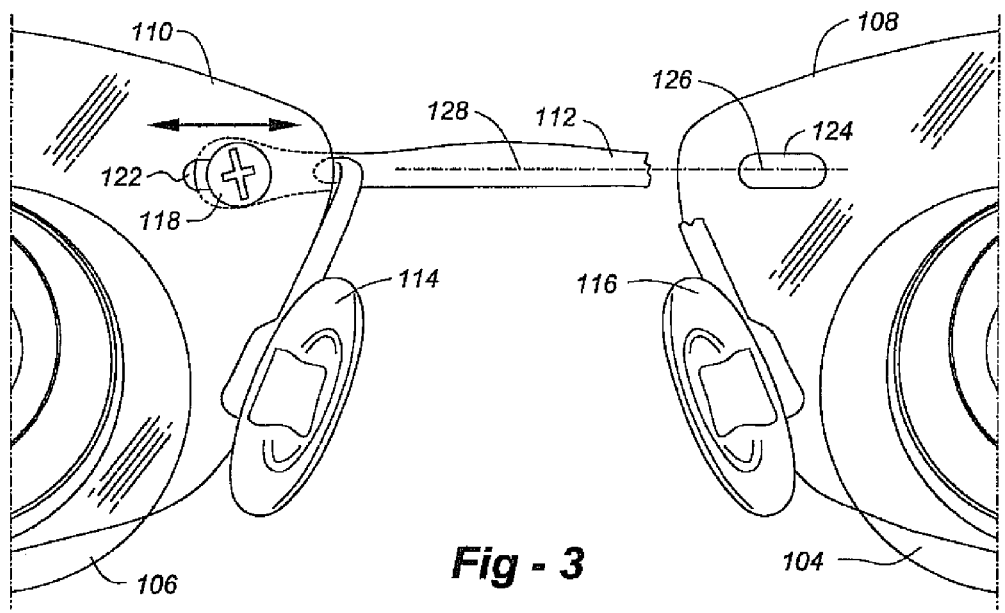
FIG. 3 is a back-to-front view detail view of the embodiment of FIG. 1.

FIG. 2 is a top view of the embodiment of FIG. 1. Note that, in the preferred embodiment, nose pads 114, 116 are each attached to the bridge member directly, such that the nose pad configuration does not change during interpupillary adjustment. The nose pads may be attached elsewhere, however, which would not present that much of a problem if interpupillary adjustment is carried out infrequently, which, in fact, should be the case for a given user.

Note that while the configuration depicted in the Figures includes decorative elements, including the temple portions and bridge member 112, the invention is not limited in terms of ornamentality.

I claim:
1. A loupe assembly of the type used by medical and dental professionals, comprising:
   a pair of lenses, each lens having a telemicroscopic ocular cemented therethrough and an upper portion on one side of a wearer's nose;
   a generally horizontal slot formed in the upper portion of one of the lenses;
   a bridge member connecting the upper portions of the two lenses, the bridge member having two ends, one end of which is coupled to the slot through a fastener that may be loosened and tightened, thereby allowing the distance between the loupes to be adjusted and locked into position in accordance with the interpupillary requirements of a user.
2. The loupe assembly of claim 1, wherein:
   the upper portion of each lens includes a slot; and
   each end of the bridge member is slidingly coupled to a respective one of the slots through a separate fastener.

3. The loupe assembly of claim 1, wherein:
the end of the bridge member which is coupled to the slot through a fastener includes a threaded bore; and
the fastener is threaded.

4. The loupe assembly of claim 1, further including a pair of nose pads, each coupled directly to the bridge member such that the interrelationship of the nose pads does not change when the distance between the loupes is adjusted.

5. The loupe assembly of claim 1, wherein the lenses are rimless.

6. The loupe assembly of claim 1, wherein the telemicroscopic loupes are Galilean.

7. The loupe assembly of claim 1, wherein the telemicroscopic loupes are Keplerian.

* * * * *